United States Patent
Liao

(10) Patent No.: US 7,859,710 B2
(45) Date of Patent: Dec. 28, 2010

(54) APPARATUS FOR SCANNING PHOTOGRAPH

(76) Inventor: Wei-Hsiang Liao, No. 30, Lane 166, Pei-Dai Rd., Hsinchu City (TW)

( * ) Notice: Subject to any disclaimer, the term of this patent is extended or adjusted under 35 U.S.C. 154(b) by 1002 days.

(21) Appl. No.: 11/700,156

(22) Filed: Jan. 31, 2007

(65) Prior Publication Data

US 2007/0188819 A1 Aug. 16, 2007

(30) Foreign Application Priority Data

Feb. 8, 2006 (TW) .............................. 95104233 A

(51) Int. Cl.
*G06K 15/00* (2006.01)
*H04N 1/40* (2006.01)

(52) U.S. Cl. ..................... 358/1.18; 358/445; 358/448

(58) Field of Classification Search .............. 358/302, 358/482, 1.15, 1.18, 448, 451, 465, 471, 358/483, 2.1, 445; 382/282, 276, 312, 166
See application file for complete search history.

(56) References Cited

U.S. PATENT DOCUMENTS

| | | | |
|---|---|---|---|
| 2004/0095469 A1* | 5/2004 | Lin | 348/207.2 |
| 2004/0233482 A1 | 11/2004 | Kuan et al. | |
| 2006/0039034 A1* | 2/2006 | Iwatani | 358/1.18 |
| 2006/0061816 A1* | 3/2006 | Iwatani | 358/1.15 |
| 2006/0230091 A1* | 10/2006 | Minobe | 708/400 |
| 2006/0251458 A1* | 11/2006 | Silverbrook et al. | 400/88 |
| 2006/0291720 A1* | 12/2006 | Malvar et al. | 382/166 |
| 2008/0309961 A1* | 12/2008 | Aichi et al. | 358/1.15 |

FOREIGN PATENT DOCUMENTS

| | | |
|---|---|---|
| CN | 1453684 A | 11/2003 |
| CN | 1464474 A | 12/2003 |
| TW | I220252 | 2/2004 |
| TW | I226792 | 1/2005 |
| TW | I237493 | 8/2005 |

OTHER PUBLICATIONS

Second Office Action for Patent Application No. CN 200610067444.2; Date of Issue: Feb. 5, 2010; Applicant: Muller Capital, LLC [translation attached].
TW Office Action for Patent Application No. TW 200731766; Issued on May 21, 2009; Applicant: Muller Capital, LLC [translation attached].

* cited by examiner

*Primary Examiner*—Jerome Grant, II
(74) *Attorney, Agent, or Firm*—Perkins Coie LLP

(57) ABSTRACT

An apparatus for scanning a photograph with PictBridge capability is provided, which includes a light source, an image sensor, a signal converter, a PictBridge encoder, and a universal serial bus (USB) controller. The light source projects a scanning light onto an object to be scanned. Upon contacting with the object to be scanned, the scanning light is reflected as a reflected light. The image sensor receives the reflected light and then transmits an image signal to the signal converter to be converted into a digital image data. The digital image signal is encoded by the PictBridge encoder to a direct-printing code. Finally, the USB controller encodes the direct-printing code into a universal serial bus signal and transmits to a printer via a USB wire, so as to print the image by the printer.

16 Claims, 3 Drawing Sheets

APPARATUS FOR SCANNING PHOTOGRAPH

CROSS-REFERENCE TO RELATED APPLICATIONS

This non-provisional application claims priority under 35 U.S.C. §119(a) on Patent Application No(s). 095104233 filed in Taiwan, R.O.C. on Feb. 8, 2006, the entire contents of which are hereby incorporated by reference.

BACKGROUND OF THE INVENTION

1. Field of Invention

The present invention relates to a scan apparatus, and more particularly, to a scan apparatus with PictBridge capability for scanning a photograph.

2. Related Art

With the popularity of digital cameras, the photograph printer that can directly print photographs has become a popular consumer electronic product. Companies and enterprises devoted to researching and manufacturing photograph printers have gradually developed digital cameras and photograph printers of different specifications. As digital cameras and photograph printers from different companies and enterprises are different in manufacturer and model, a compatibility problem among digital cameras with photograph printers of different models occurs.

To solve such a problem, in 2002, the Direct Print Standard (DPS) via universal serial bus (USB) was worked out by the cooperation of Canon, Fuji Film, HP, Olympus, Seiko Epson, and Sony. In the past, only digital cameras and photograph printers of the same vender could be connected to each other via a USB wire to print directly. Hereafter, with the direct print standard (DPS), any digital camera and photograph printer both adopting the DPS could be connected to each to print directly.

Afterward, the Digital Photo Solutions for Imaging Devices, i.e., the so called PictBridge standard, named by the Camera & Imaging Products Association (CIPA), became dominant.

Currently, there are two ways to print a photograph after it is scanned. One way is shown in FIG. 1. A light source 100 in a scanner 20 projects a scanning light M onto a photograph 10 to be scanned. The scanning light M is reflected by the photograph 10 to be scanned, and a reflected light L is generated. The reflected light L is then received by an image sensor 200 in the scanner 20, a corresponding image signal is generated and output. Then, the image signal is converted into a digital image data by a signal converter 300 of the scanner 20. Then, the digital image data is transmitted to an electronic device 50 connected to the scanner 20 via a data bus 400. After that, a user uses the electronic device 50 to display, recognize, edit, store, and output images. Further, the electronic device 50 may be a desktop computer, a laptop computer, a palm handheld computer, a personal digital assistant (PDA), a mobile phone, etc. The digital image data that has already been edited by the electronic device 50 is transmitted to a printer 30 connected to the electronic device 50. After being printed by the printer 30, a printed photograph 40 is obtained from the printer 30.

However, this operating method is inconvenient, and as for the user without a computer, buying one is a great additional burden.

The other way is to print by a so-called multifunction printer (MFP). A photograph is directly scanned by the scanning module of the multifunction printer, and then, it is directly printed by the printing module of multifunction printer. On the other hand, since the multifunction printer has various processing functions, the price is high. Therefore, with the above methods, even for the user only requiring the functions of scanning and directly printing, expensive devices must be acquired, which is undesirable.

SUMMARY OF THE INVENTION

In view of the above, the object of the invention is to provide an apparatus for scanning a photograph with PictBridge capability, which is connected to a printer via a universal serial bus (USB), to scan and then directly print photographs.

The apparatus for scanning a photograph of the invention includes a light source, an image sensor, a PictBridge encoder, and a universal serial bus (USB) controller. The light source of the apparatus for scanning a photograph projects a scanning light onto an object to be scanned, and the scanning light is reflected as a reflected light. The image sensor is receives the reflected light and outputs a corresponding image signal according to this reflected light. After that, the signal converter converts the image signal into a digital image data. Then, the PictBridge encoder encodes the digital image data to a direct-printing code. Finally, the USB controller encodes the direct-printing code into a universal serial bus signal and transmits to a printer via a USB wire, so as to print the image by the printer.

The apparatus for scanning a photograph of the present invention additionally disposed with a PictBridge encoder is used to solve the compatibility problem among apparatuses for scanning a photograph with printers of different venders, thus the computer device required in prior art can be omitted, and it can be directly connected to a printer to print photographs. Also, there is no need to buy a multifunction printer with its high price and big volume.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow for illustration only, and which thus is not limitative of the present invention, and wherein.

DETAILED DESCRIPTION OF THE INVENTION

To further understand the objects, constructions, features, and functions of the present invention, detailed illustration is provided below through embodiments.

Figure 1:
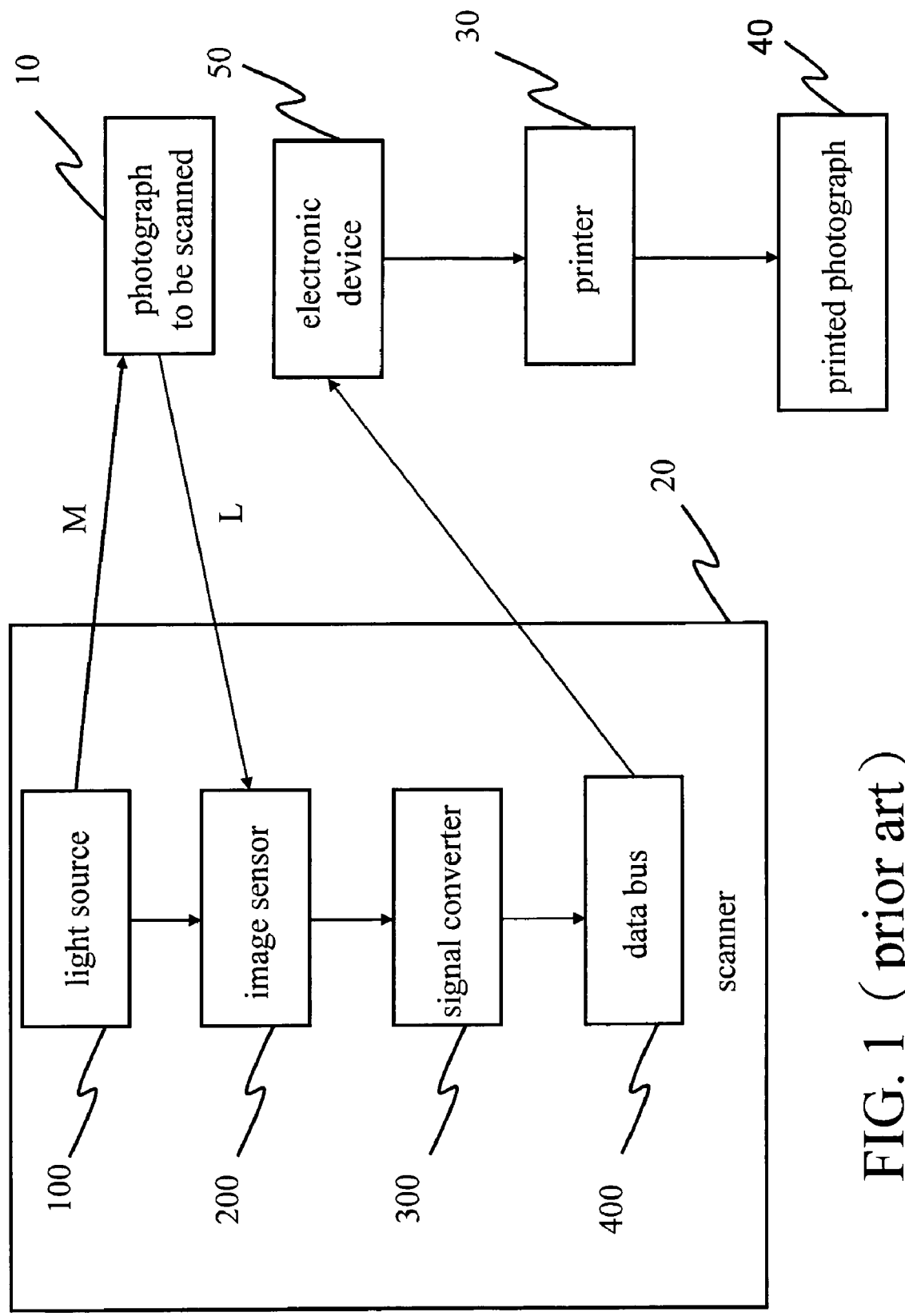
FIG. 1 is a block diagram of an apparatus for scanning a photograph in the prior art.
Figure 2:
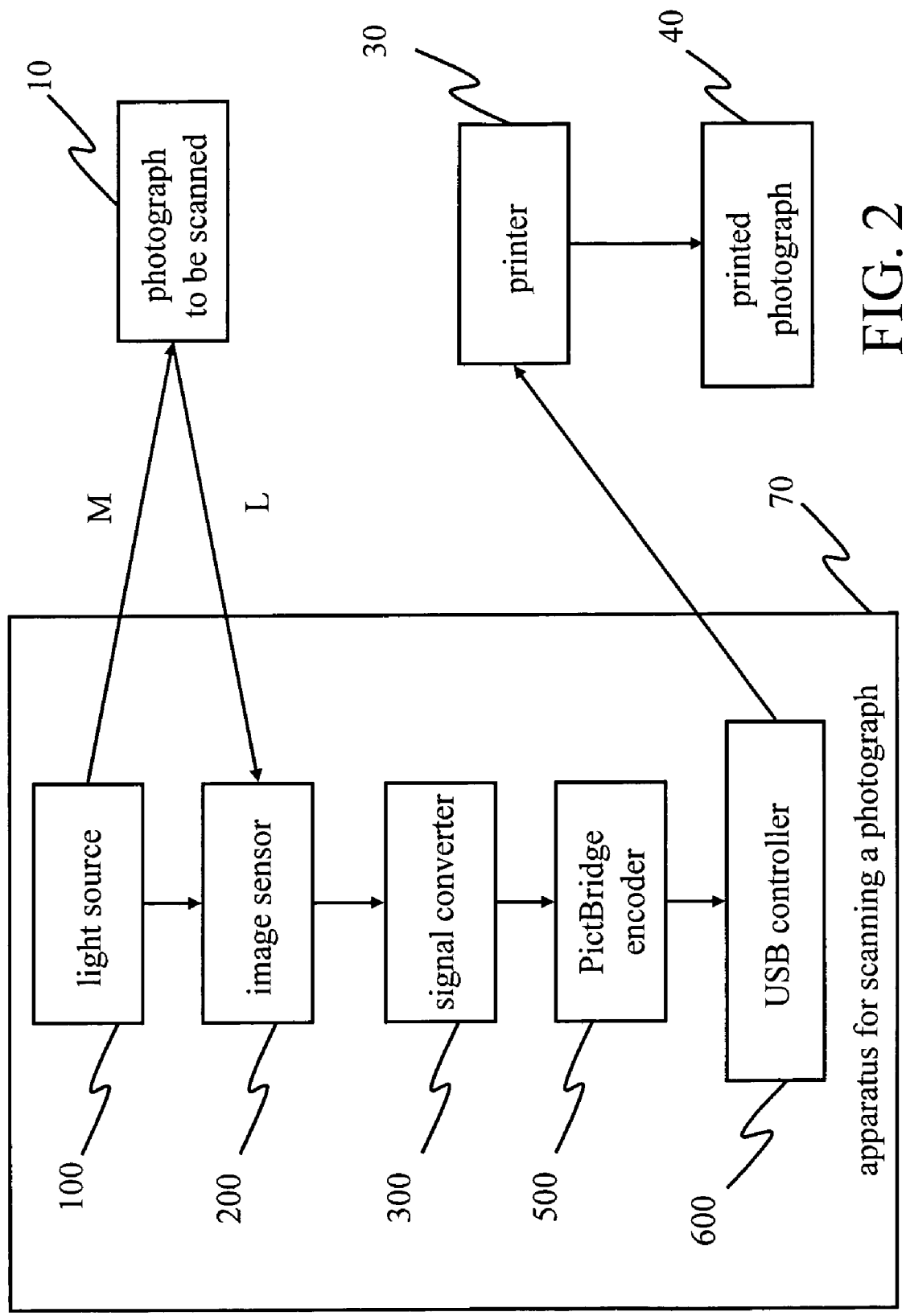
FIG. 2 is a block diagram of an apparatus for scanning a photograph with PictBridge capability according to a first embodiment of the present invention.

Referring to FIG. 2, it is a block diagram of an apparatus 70 for scanning a photograph with PictBridge capability according to a first embodiment of the present invention. The apparatus 70 for scanning a photograph includes a light source 100, an image sensor 200, a signal converter 300, a PictBridge encoder 500, and a universal serial bus (USB) controller 600.

Although the detail of light source 100 is not shown in FIG. 2, the light source 100 can be cold cathode fluorescent lamps, white light-emitting diodes (LEDs), or a light-emitting diode array which emits white light.

The image sensor 200 is used to capture the image of a document to be scanned (e.g., a photograph 10 to be scanned), and several analog monochromatic image signals are output accordingly. The image sensor 200 can be a charge coupled device (CCD), and other types of image sensors also can be used, such as a contact image sensor (CIS). The image sensor 200 is used to generate N (N is a natural number) scan lines according to the photograph 10 to be scanned, and to output the corresponding image signal according to each scan line. For example, for a scan apparatus with a resolution of 600 dpi, the image sensor 200 generates 600 scan lines for each inch of the object to be scanned (e.g., the photograph 10 to be scanned).

The signal converter 300 is provided for converting an analog signal into a digital signal, so as to convert an image signal into a digital image data to be encoded.

The PictBridge encoder 500 is provided for encoding the digital image data to a direct-printing code for PictBridge, to solve the compatibility problem among apparatuses for scanning a photograph with a printer.

The USB controller 600 is is provided for encoding the direct-printing code into a universal serial bus signal and transmits the universal serial bus signal to a printer via a USB wire. The specification of the USB is a protocol standard worked out cooperatively by global information technology companies and enterprises such as Intel, IBM, Microsoft, Compaq, Northern Telecom of Canada, and the Digital Electronics Company (DEC). The USB is classified into full-speed transmission of 12 Mbps (USB 2.0) and low-speed transmission of 1.5 Mbps (USB 1.0). In addition, any apparatus using the USB as the data transmission interface has the functions of plug and play (PNP), and hot swapping, that is, by simply being plugged into the power supply, it can be connected and used without any other installation procedure. Therefore, the photograph can be printed via a printer after being scanned in the present invention through the PictBridge encoder 500 and the USB controller 600.

The detailed operating process is illustrated below. As shown in FIG. 2, the light source 100 of the apparatus 70 for scanning a photograph of the present invention projects a scanning light M onto a object to be sensed (e.g., photograph 10 to be scanned). After the scanning light M is reflected as a reflected light L by the photograph 10 to be scanned, the reflected light L is received by the image sensor 200, and then several analog image signals are output according to the reflected light L. Then, the signal converter 300 receives the image signals and converts the image signals into digital image data. The PictBridge encoder 500 encodes the digital image data into direct-printing codes compatible with a printer 30. Then, the USB controller 600 encodes the direct-printing codes into USB signals and transmits the USB signals to the printer 30 via a USB wire. After being compiled by the printer 30, a photograph 40 is printed by the printer.

In the first embodiment, the signal converter 300, the PictBridge encoder 500, the USB 600 shown in FIG. 2 can be separate application specific integrated circuits (ASIC) or microprocessors.

Figure 3:
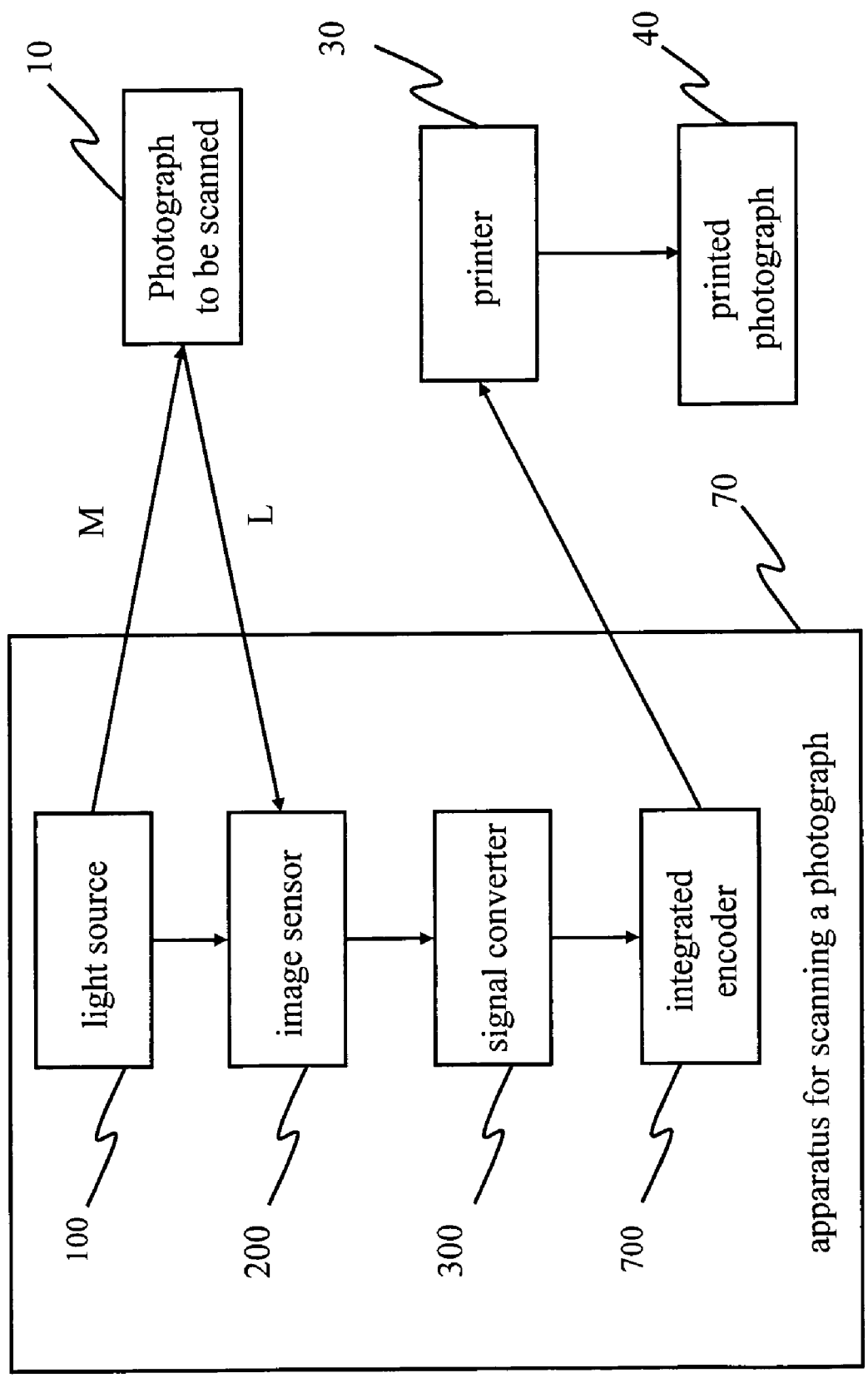
FIG. 3 is a block diagram of an apparatus for scanning a photograph with PictBridge capability according to a second embodiment of the present invention.

Referring to FIG. 3, apparatus 70 for scanning a photograph of second embodiment of the present invention includes an integrated encoder 700, that is the PictBridge encoder 500 and the USB controller 600 are integrated into a single unit, such as a singal application specific integrated circuit (ASIC), thus, saving space and reducing the volume of the apparatus for scanning a photograph. In second embodiment, the integrated encoder 700 encodes the digital data into direct-printing codes, encodes the direct-printing codes into USB signals, and transmits the USB signals to a printer.

In another embodiment, the signal converter 300, the PictBridge encoder 500, and the USB 600 are integrated into a single application specific integrated circuit (ASIC).

In still another embodiment, the apparatus 70 for scanning a photograph of the present invention also can be used to scan the positive and negative films. Since the scanning light M can penetrate through the positive and negative films, a reflected light L will not be generated to be received by the image sensor 200. Therefore, after the positive film and negative film to be scanned are placed on the apparatus 70 for scanning a photograph, a mask (not shown) is required to be further disposed into the apparatus 70 for scanning a photograph, so as to achieve the same scanning effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus, comprising:
    a light source positioned to project a scanning light onto an object to be scanned;
    an image sensor positioned to receive reflected light from the object, generate a plurality of scan lines according to the object, and output a corresponding image signal;
    a signal converter configured to convert the image signal into a digital image data;
    a PictBridge encoder configured to encode the digital image data to a direct-printing code; and
    a universal serial bus (USB) controller configured to encode the direct-printing code into a USB signal and transmit the USB signal to a printer via a USB wire.

2. The apparatus of claim 1 wherein the light source comprises at least one cold cathode fluorescent lamp.

3. The apparatus of claim 1 wherein the light source comprises at least one light-emitting diode.

4. The apparatus of claim 3 wherein the light-emitting diode is white light-emitting diode.

5. The apparatus of claim 1 wherein the light source comprises a light-emitting diode array that emits white light.

6. The apparatus of claim 1 wherein the image sensor comprises a charge coupled device.

7. The apparatus of claim 1 wherein the image sensor comprises a contact image sensor.

8. The apparatus of claim 1 wherein the signal converter, the PictBridge encoder, and the USB controller are separate application specific integrated circuits.

9. The apparatus of claim 1 wherein the signal converter, the PictBridge encoder, and the USB controller are integrated into a single application specific integrated circuit.

10. A scanner, comprising:
    a light source positioned to project a scanning light onto a document;
    an image sensor positioned to receive a reflected light from the document to be scanned, and output a corresponding image signal;

a signal converter configured to convert the image signal into a digital image data; and an integrated encoder configured to
- encode the digital image data to a direct-printing code for PictBridge;
- encode the direct-printing code into a universal serial bus (USB) signal; and
- transmit the USB signal to a printer.

11. The scanner of claim 10 wherein the signal converter and the integrated encoder are separate application specific integrated circuits.

12. The scanner of claim 10 wherein the signal converter and the integrated encoder are integrated into a single application specific integrated circuit.

13. The scanner of claim 10, further comprising a scanner body, and wherein the light source, the image sensor, the signal converter, and the integrated encoder are all contained within the scanner body.

14. The scanner of claim 13 wherein the printer is a separate distinct component spaced apart from the scanner body.

15. The scanner of claim 10 wherein the light source comprises at least one of the following: a cold cathode-fluorescent lamp or a light-emitting diode.

16. The scanner of claim 10 wherein the image sensor comprises at least one of the following: a charge coupled device or a contact image sensor.

* * * * *

UNITED STATES PATENT AND TRADEMARK OFFICE
CERTIFICATE OF CORRECTION

| | | |
|---|---|---|
| PATENT NO. | : 7,859,710 B2 | Page 1 of 1 |
| APPLICATION NO. | : 11/700156 | |
| DATED | : December 28, 2010 | |
| INVENTOR(S) | : Liao | |

It is certified that error appears in the above-identified patent and that said Letters Patent is hereby corrected as shown below:

Title page, item (76), under "Inventor", in Column 1, Line 2, delete "Pei-Dai" and insert -- Pei-Da --.

Column 5, line 3, in Claim 10, delete "to" and insert -- to: --.

Signed and Sealed this

Seventeenth Day of May, 2011

David J. Kappos
*Director of the United States Patent and Trademark Office*